UNITED STATES PATENT OFFICE.

JACOB S. ROBESON, OF CAMDEN, NEW JERSEY, ASSIGNOR TO ROBESON PROCESS COMPANY, OF CAMDEN, NEW JERSEY, A CORPORATION OF NEW JERSEY.

COMPOSITION OF MATTER AND PROCESS OF MAKING SAME.

No. 851,378.   Specification of Letters Patent.   Patented April 23, 1907.

Application filed April 4, 1906. Serial No. 309,913.

*To all whom it may concern:*

Be it known that I, JACOB S. ROBESON, a citizen of the United States, and a resident of Camden, Camden county, New Jersey, have invented an Improved Composition of Matter and Process of Making Same, of which the following is a specification.

My invention relates to compositions of matter having adhesive properties, and consists of an improved compound of this nature comprising a mass of sulfite liquor combined with a farinaceous vegetable material rich in protein or proteids. My invention comprises further the method or process of making this improved composition of matter.

In the manufacture of cellulose or paper pulp under what is known as the "sulfite process," which consists in boiling wood and other fibres under pressure in a solution containing sulfurous acid and a base, such as lime or magnesia, a vast quantity of a watery mixture known as "waste sulfite liquor" is produced that hitherto has had little value, besides being highly objectionable in a number of ways, and very difficult of disposal.

In carrying the method or process of my present invention into effect, I may employ the raw waste liquor; or a concentrated or evaporated solution of the same; preferring, however, to use a neutral, undecomposed and concentrated mass of this waste liquor made in accordance with a method I have developed of utilizing such material. In my patent, No. 833,634, dated October 16, 1906, I have set forth a process of treating this raw waste liquor, by rendering it substantially neutral with the aid of milk of lime or other suitable alkaline material, and then concentrating such neutralized body *in vacuo* at a substantially uniform temperature, without decomposition, to a desirable density.

In the preferred method or process of making my improved compound, I propose to use this substantially neutral, undecomposed and concentrated mass of waste sulfite liquor made in accordance with the process above set forth, and to a quantity of this liquor at a density of about 25° B., I add a liquid solution of farinaceous vegetable material previously prepared.

The required quantity of the concentrated sulfite liquor at the desired density is run into a vacuum pan, and the required quantity of the farinaceous vegetable material in a watery condition is sucked into said pan by the vacuum therein. The vacuum is then broken and the mixture heated until the ingredients are thoroughly and intimately mixed and form a homogeneous mass.

While almost any comminuted starchy vegetable material, such as potatoes, corn, barley &c., may be used, as these materials all contain both starch and proteid matter, yet in practice I have found that wheat flour is one of the most desirable forms of farinaceous vegetable material to employ as the addition to the concentrated mass of sulfite liquor, and I prefer to employ any low grade milling product that is richer in protein than the higher grades of flour. The proportions of this material may vary within certain limits, and the density at which the same is mixed may also vary. I have obtained good results, however, with 75 parts by volume of the neutral, undecomposed and concentrated sulfite liquor at a density of about 25° B., and 25 parts by volume of the solution, paste or emulsion of flour or other farinaceous vegetable material.

In preparing the solution, paste or emulsion of flour or other farinaceous vegetable material, the quantity of such material required is mixed with water until it is about the consistency of thin milk, although in some instances I may use the raw and unconcentrated waste sulfite liquor as the liquid medium for forming this mixture.

Instead of employing a raw solution of the farinaceous vegetable material for addition to the concentrated mass of waste sulfite liquor, I may cook such farinaceous material to a greater or less degree and add it in the heated condition in the required proportion to the concentrated mass of sulfite liquor. The liquid medium for cooking the farinaceous vegetable material may be water or the raw sulfite liquor.

I may prepare this improved adhesive by mixing the farinaceous vegetable material in a comminuted state, either dry or in a liquid condition, with the raw sulfite liquor prepared for concentration and then evaporate the resulting mixture to the desired density in the manner before set forth; the farinaceous material being cooked during such concentration.

The improved adhesive forming the subject of my present invention is valuable for numerous purposes in the arts and may be employed as a binder for sand in the manufacture of cores, or for binding other granular material of an inorganic nature.

I claim:

1. An adhesive, containing chemically unaltered sulfite liquor, and farinaceous vegetable material.

2. An adhesive, comprising a neutral, undecomposed and concentrated mass of sulfite liquor, and farinaceous vegetable material.

3. An adhesive, containing chemically unaltered sulfite liquor, and a vegetable proteid.

4. An adhesive, comprising a neutral, undecomposed and concentrated mass of sulfite liquor, and a vegetable proteid.

5. An adhesive, containing chemically unaltered sulfite liquor and wheat flour.

6. An adhesive, comprising a neutral, undecomposed and concentrated mass of sulfite liquor, and wheat flour.

7. An adhesive, comprising chemically unaltered sulfite liquor, and a flour rich in protein.

8. An adhesive, comprising a neutral, undecomposed and concentrated mass of sulfite liquor, and a flour rich in protein.

9. An adhesive, comprising seventy-five (75) parts by volume of a neutral, undecomposed and concentrated mass of waste sulfite liquor, and twenty-five (25) parts by volume of a farinaceous vegetable material in a fluent form.

10. An adhesive, comprising seventy-five (75) parts by volume of a neutral, undecomposed and concentrated mass of waste sulfite liquor, and twenty-five (25) parts by volume of wheat flour in a fluent form.

11. The process herein described of making an adhesive, said process consisting in evaporating sulfite liquor, and then adding thereto a quantity of farinaceous vegetable material.

12. The process herein described of making an adhesive, said process consisting in evaporating sulfite liquor, and then adding thereto a quantity of wheat flour in a fluent form.

13. The process herein described of making an adhesive, said process consisting in evaporating sulfite liquor, adding a quantity of farinaceous vegetable material thereto, and then cooking said mixture to a homogeneous condition.

14. The process herein described of making an adhesive, said process consisting in evaporating sulfite liquor, adding a quantity of wheat flour thereto, and then cooking said mixture to a homogeneous condition.

15. The process herein described of making an adhesive, said process consisting in evaporating sulfite liquor, cooking a quantity of farinaceous vegetable material, adding it to the concentrated sulfite liquor, and then heating the mixture to form a homogeneous mass.

16. The process herein described of making an adhesive, said process consisting in evaporating sulfite liquor, cooking a quantity of wheat flour, adding it to the concentrated sulfite liquor, and then heating the mixture to form a homogeneous mass.

17. The process of making an adhesive, which consists in heating a mixture of waste sulfite liquor and farinaceous material to cook and concentrate the same.

18. The process of making an adhesive, which consists in heating a mixture of waste sulfite liquor and wheat flour to cook and concentrate the same.

19. The process herein described of making an adhesive, said process consisting in evaporating sulfite liquor, adding thereto a fluent body of farinaceous vegetable material, and then heating the combined mass to such a point as will cause an intimate and complete admixture of such constituents.

20. The process herein described of making an adhesive, said process consisting in evaporating sulfite liquor, adding thereto a fluent body of wheat flour, and then heating the combined mass to such a point as will cause an intimate and complete admixture of such constituents.

In testimony whereof, I have signed my name to this specification, in the presence of two subscribing witnesses.

JACOB S. ROBESON.

Witnesses:
 MURRAY C. BOYER,
 JOS. H. KLEIN.